United States Patent [19]
Murakami et al.

[11] 3,709,340
[45] Jan. 9, 1973

[54] FLUID RELEASED CLUTCH CONTROLLED BY ENGINE SPEED AND GEAR SHIFTER

[75] Inventors: Noboru Murakami; Tatsuo Naruto; Nobuyuki Hashimoto, all of Kariya, Japan

[73] Assignee: Aisin Seiki Kabushiki Kaisha, Aichi-ken, Japan

[22] Filed: April 26, 1971

[21] Appl. No.: 137,256

[30] Foreign Application Priority Data

April 27, 1970 Japan ..................................45/36065
April 27, 1970 Japan ..................................45/36067

[52] U.S. Cl.................192/3.58, 251/132, 192/91 R, 192/105 F
[51] Int. Cl.............................................F16d 43/284
[58] Field of Search...................192/103 R, 103 F, 103 FA, 104 F, 192/105 A, 105 F, 3.58, 109 F, 91 R, 91 A

[56] References Cited

UNITED STATES PATENTS

| | | | |
|---|---|---|---|
| 2,995,957 | 8/1961 | Wilson et al. | 192/3.58 |
| 2,362,242 | 11/1944 | Casler | 192/91 R |
| 2,759,584 | 11/1956 | Brueder | 192/91 R |
| 2,365,470 | 12/1944 | Ingres | 192/.075 |
| 2,589,628 | 3/1952 | Price | 192/.076 |
| 2,605,873 | 8/1952 | Prather | 192/91 R |

*Primary Examiner*—Benjamin W. Wyche
*Attorney*—Moonray Kojima

[57] ABSTRACT

A spring engaged friction clutch is released by a fluid pressure operated motor controlled by a pressure modulating exhaust valve. At idling speed and during gear shifting, the valve is closed by a solenoid to cause release of the clutch. An electronic device 52 produces and output voltage inversely proportioned to engine R. P. M. so as to supply a decreasing voltage to the solenoid as engine speed increases above idling to cause the valve to slowly open and the motor to gradually engage the clutch.

14 Claims, 4 Drawing Figures

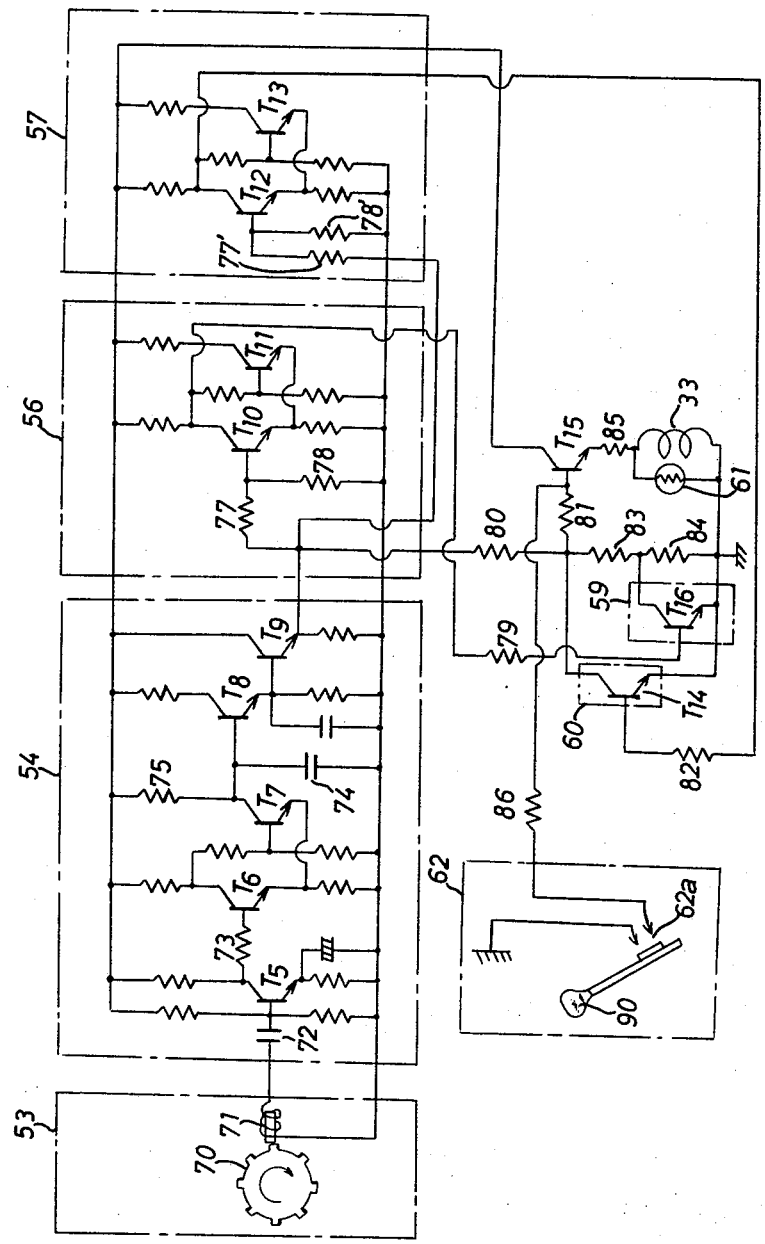

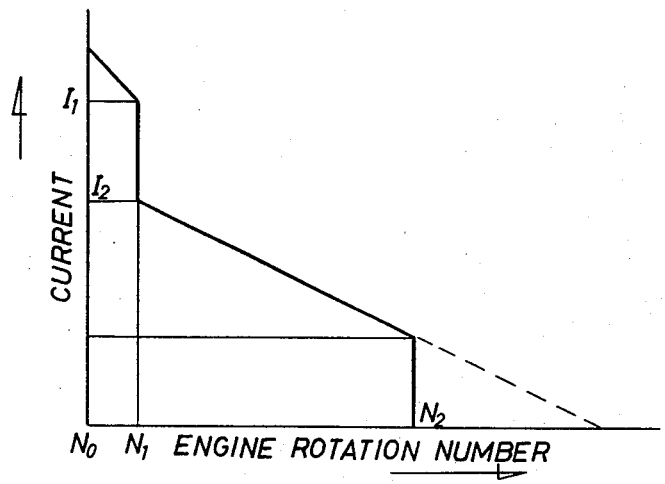
Fig: 3
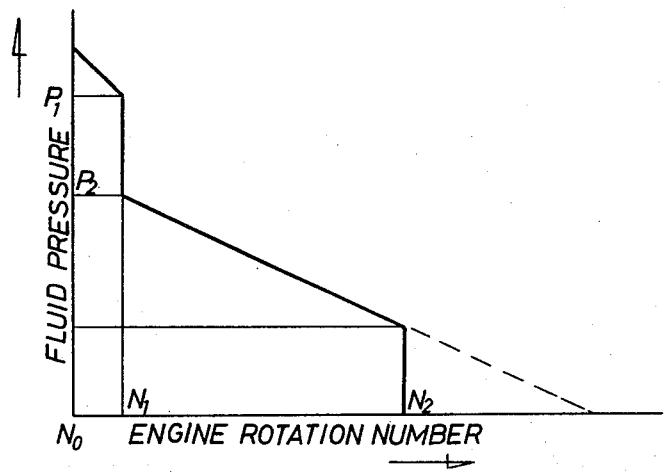
Fig. 4

FLUID RELEASED CLUTCH CONTROLLED BY ENGINE SPEED AND GEAR SHIFTER

BACKGROUND

The present invention relates to a friction disc clutch for a vehicle, and more particularly to an automatic control system for the clutch.

SUMMARY

An object of the present invention is to provide an automatic control system for a friction disc clutch of a vehicle, which enables easier starting and drive power train shifting operations by eliminating manual operation of a clutch pedal provided with an ordinary vehicle.

Another object of the present invention is to provide an automatic control system for a friction disc clutch of a vehicle having the above-mentioned characteristics, wherein the system can be adopted for any ordinary type of a vehicle, thereby to decrease foot pedals from three to two.

A further object of the present invention is to provide an automatic control system for a friction disc clutch of a vehicle having the above-mentioned characteristics, wherein the engagement and disengagement of the clutch can automatically and smoothly be conducted in response to the engine rotation.

A still further object of the present invention is to provide an automatic control system for a friction disc clutch of a vehicle having the above-mentioned characteristics, wherein the system is provided with hydraulic control means for controlling the engagement and disengagement of the clutch and with an electric control system for regulating the hydraulic control means in good and accurate response to the engine rotation.

Yet another object of the present invention is to provide an automatic control system for a friction disc clutch of a vehicle having the above-mentioned characteristics, wherein suitable hydraulic servo means is adopted to control the engagement and disengagement of the clutch, the servo means being operable through fluid pressure control valve means regulated by the electric control system.

A still further object of the present invention is to provide an automatic control system for a friction disc clutch of a vehicle having the above-mentioned characteristics, wherein the fluid pressure control valve means is of a simple but durable construction available at a low manufacturing cost.

An automatic control system of a friction disc clutch constructed in accordance with the present invention may comprise hydraulic servo means for engaging and disengaging the clutch, fluid pressure control valve means for controlling fluid pressure supplied to the servo means from a source of fluid pressure, solenoid means for regulating operation of the valve means by its energy in response to the rotation number of an engine of the vehicle, and current control means for detecting the rotation number of the engine and for determining the amount of current supplied to the solenoid means.

DESCRIPTION OF THE DRAWINGS

Other objects and features of the present invention will be more clear in the following description of one preferred embodiment, especially when read in conjunction with the accompanying drawings, in which;

FIG. 2 depicts a preferred embodiment of an electric control system adopted to the embodiment of FIG. 1;

FIG. 3 depicts a characteristic curve to show the change of the current in correspondence with the change of the engine rotation number;

FIG. 4 depicts a characteristic curve to show the change of the fluid pressure value in correspondence with the change of the engine rotation number.

DESCRIPTION OF THE PREFERRED EMBODIMENTS

Figure 1:
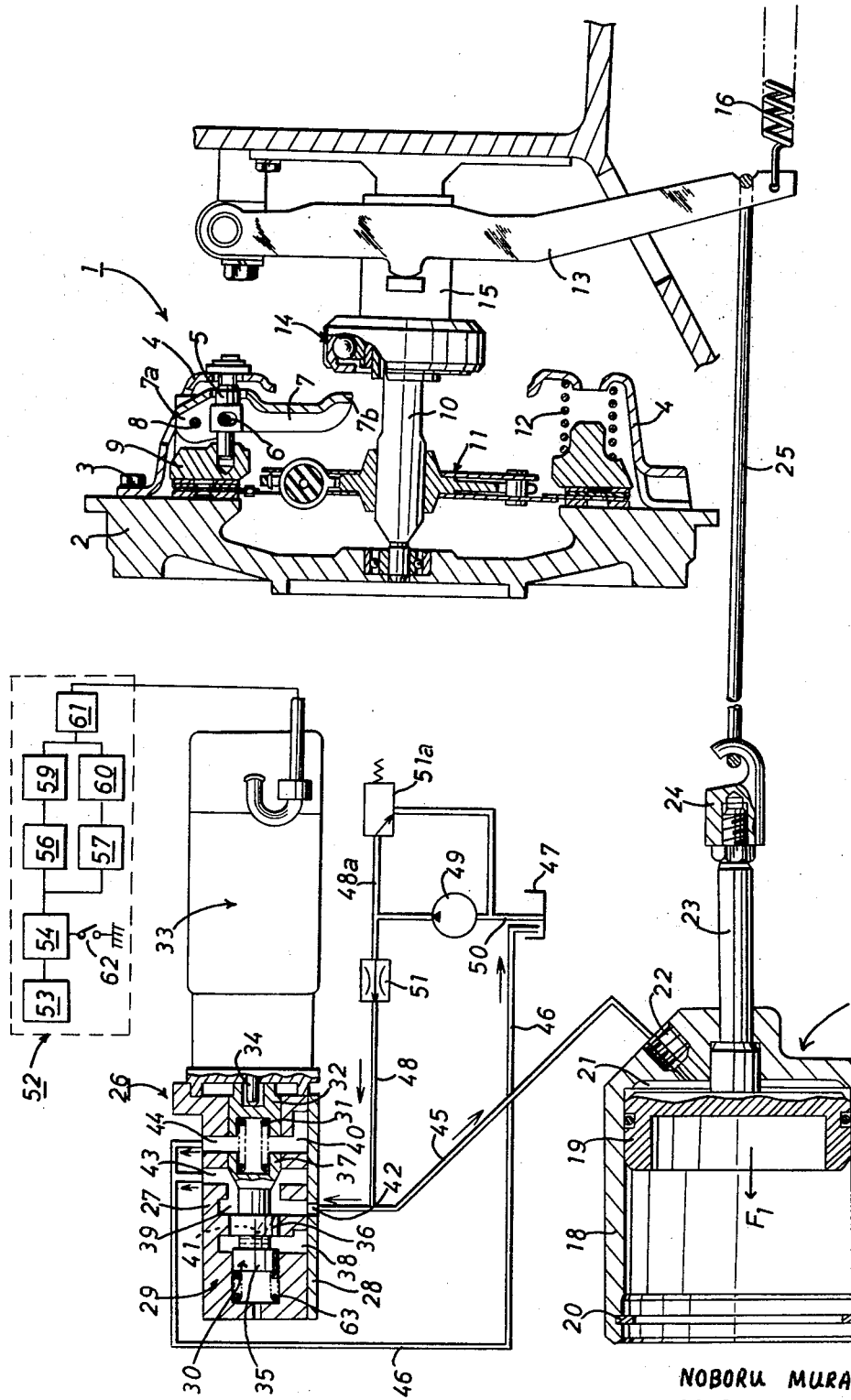
FIG. 1 is a part cross-sectional view of the preferred embodiment of the present invention, showing also connections of the constructing portions.

Referring now to the drawings in detail, the clutch arrangement illustrated therein comprises a flywheel 2 which is connected to an engine through a drive shaft (not shown). The flywheel 2 has a clutch cover 4 secured firmly on the annular flange thereof by bolts 3. The clutch cover 4 is designed approximately in an annular shape and has surfaces arranged parallel with the flywheel 2. An adjusting bolt 5 is adjustably threaded in a pressure plate 9 through the clutch cover 4. A release lever 7 is swingably pivoted on the bolt 5 by a pivot pin 6. The pressure plate 9 is pivoted on one end portion 7a of the release lever 7 by a pivot pin 8. A clutch disc 11 is so mounted that the outer circumference thereof is interposed between the flywheel 2 and the pressure plate 9 and the inner hub thereof has a driven shaft 10 splined therein. A spring 12 is interposed between the clutch cover 4 and the pressure plate 9. Resilient force of the spring 12 normally holds the clutch disc 11 pressed between the flywheel 2 and the pressure plate 9 to obtain frictional engagement thereat.

A release fork 13 is swingable mounted on a portion of the vehicle body. Clockwise swing of the release fork 13 makes a release hub 15 proceed forward, which causes a release bearing 14 to engage with the other end 7b of the release lever 7. Consequently, clockwise swing of the release lever 7 displaces the pressure plate 9 right-ward. A return spring 16 is stretched between the release fork 13 and a portion of the vehicle and biases the release fork 13 counter-clockwise.

Hydraulic servo means 17 comprises a housing 18, a piston 19 reciprocatably engaged within the cylindrical bore of the housing 18, and a stopper member 20 threaded within the bore of the housing 18. The housing 18 and the piston 19 incorporate to form a pressure chamber 21 to which a port 22 drilled through the housing 18 is always open. A piston rod 23 extending from the piston 19 has a hook 24 threaded in at its outer end. A release wire 25 is stretched between the hood 24 and the free end of the release fork 13.

When the piston 19 is actuated and retracts or moves leftward in the figure by fluid pressure delivered into the pressure chamber 21 through the port 22, the release fork 13 makes its clockwise swing against the resilient force of the return spring 16 through the piston rod 23 and the release wire 25. This causes the release hub 15 move toward the frictional disc clutch 1 and urge the release bearing 14 against the release lever 7. Consequently, the clutch 1 disengages. When the fluid pressure is removed from the pressure chamber 21, the return spring 16 makes the release fork 13 swing counter-clockwise, the piston 19 returning to its forwarded position. The clutch 1 engages by resilient force of the spring 12.

Hydraulic pressure regulating valve means 26 comprises a valve housing 29 including a body member 27 and a cover member 28, springs 63, and 31, a spring retainer 32 and a valve member 30 engaged slidably within the cylindrical bore of the housing 29. The valve member 30 is provided with a small diameter land 35, a large diameter land 36 and a large diameter land 37 of which the diameter is same as that of the large diameter land 36. Chambers 38 and 39 are formed respectively between the lands 35 and 36 and between the lands 36 and 37. The land 37 and the spring retainer 32 form a chamber 40. A through hole 41 drilled in the valve member 30 provides constant connection between the chambers 38 and 39. Ports 42, 43 and 44 are provided on the valve housing 29 axially along the valve member 30. The port 42 keeps constant connection with the chamber 39, and the port 44 also opens always to the chamber 40. Sliding movements of the valve member 30 make the port 43 connect with and closed against the chamber 39.

A conduit 45 keeps constant connection between the port 42 and the port 22 of the hydraulic servo means 17. The ports 43 and 44 are always in communication with a reservoir 47 through a conduit 46. A conduit 48 connects the conduit 45 always with a hydraulic pump 49 driven by the prime engine of the vehicle, the pump 49 being further connected with the reservoir 47 through a conduit 50. A flow regulating valve 51 is disposed within the conduit 48. The conduit 48 has a branch 48a which extends to a pressure control valve 51a. The pressure control valve 51a controls fluid pressure within the conduit 48 not to exceed a certain predetermined maximum value. A solenoid 33 is mounted to have its left side face against the right side of the valve housing 29. A plunger 34 of the solenoid 33 keeps engagement with the outer portion of the spring retainer 32. The hydraulic regulating valve means 26 is so constructed that the valve member 30 will not close the port 43 against the chamber 39 when the outer portion of the spring retainer 32 engages with the plunger 34 of the solenoid 33 with the spring 31 in its fully stretched situation.

Fluid pressure discharged from the pump 49 is delivered to the pressure chamber 21 as well as to the chambers 39 and 38 through the conduits 48 and 45 and is circulated to the reservoir 47 through the pressure regulating valve means 26. When no current is supplied to the solenoid 33, there is no urging force produced to slide the valve member 30 leftward to close the port 43 against the chamber 39. Thus, it can be seen that the value of the fluid pressure within the circuit from the pump 49 to the hydraulic servo means 17 and to the chambers 39 and 38 is of the atomospheric pressure. Current supplied to the solenoid 33 operates the solenoid 33 to push the plunger 34 outward or leftward in the figure. The thrusting force of the plunger 34 is conveyed to the valve member 30 through the spring 31 and the valve member 30 moves leftward. The value of the fluid pressure within the circuit increases up to the one that is shown as:

| (Thrusting Force of the plunger 34) | − | (Resilient Force of the spring 63) |
|---|---|---|
| Difference of cross-sectional areas between the lands 35 and 36 | | |

The thrusting force of the plunger 34 is changeable in accordance with the changes of the current supplied to the solenoid 33. And the changes of the thrusting force of the plunger 34 varies in turn the fluid pressure value within the circuit. The indirect transmission of the thrusting force of the plunder 34 by way of the spring 31 provides the thrusting force of the plunger 34 with wider changes than otherwise.

An automatic electric control system 52 for controlling amount of current supplied to the solenoid 33 comprises a detecting circuit 53 for detecting the rotation number of the prime engine of the vehicle. The control system 52 is also provided with a converter circuit 54 for converting pulse signals issued by the detecting circuit 53 to analogue voltage. Adopted for the control system 52 are two rotation number determining circuits 56 and 57, and two current control circuit 59 and 60. A compensation circuit 61 is to compensate the changes of the current caused by changes of the temperature and the drive shift detecting circuit 62 is to sense the drive power train shifting operations.

Now described below is a preferred embodiment of the electric control system 52 in reference with FIG. 2. The detecting circuit 53 has a sensor 71 of a well-known electro-magnetic pickup device. The teeth of a starter gear 70 provided on the outer circumference of the flywheel 2 changes magnetic flux of the sensor 71. Thus, the sensor 71 detects rotation speeds of the engine as sine waves.

In the converter circuit 54, a transistor $T_5$ amplifies the sine waves from the senser 71 through a condenser 72. A first Schmitt circuit is provided that includes transistors $T_6$ and $T_7$ to convert the amplified output from the transistor $T_5$ to pulse output through a resistor 73. A condenser 74 is charged through a resistor 75 in response with the pulse output from the first Schmitt circuit. The pulse output is converted to the analogue amount by way of a integrator which consists of the condenser 74 and the resistor 75. The collector electric potential of a transistor $T_8$ falls and rises respectively in correspondence with the voltage increase and decrease of the condenser 74. A transistor $T_9$ amplifies the current of the collector output from the transistor $T_8$.

The converter circuit 54 constructed as described above, the transistor $T_6$ of the first Schmitt circuit becomes non-conductive while transistor $T_7$ becomes conductive when there is no engine rotation. Thus, the voltage of the condenser 74 is lowered and the collector voltage of the transistor $T_8$ becomes the highest therefor. The rotation of the engine causes repeated alternate on-off operations of the transistors $T_6$ and $T_7$ of the first Schmitt circuit. While the transistor $T_7$ is conditioned to be non-conductive, the condenser 74 is charged through the resistor 75 to increase the base voltage of the transistor $T_8$. This causes the collector potential of the transistor $T_8$ to fall down in accordance with the voltage increase of the condenser 74. Consequently, the emitter potential of the transistor $T_9$ falls down in comply with the increase of the engine rotation.

The rotation number determining circuit 56 comprises a second Schmitt circuit. This second Schmitt circuit includes a transistor $T_{11}$ and a transistor $T_{10}$ connected with the emitter end of the transistor $T_9$ through a resistor 77. While the engine is conditioned to its idling rotation, the emitter potential of the transistor $T_9$ is high to make the transistor $T_{10}$ conductive and the transistor $T_{11}$ non-conductive. The increase of the engine rotation up to the predetermined number makes the emitter potential of the transistor $T_9$ fall down. This makes the transistor $T_{10}$ non-conductive and the transistor $T_{11}$ conductive.

Another rotation number determining circuit 57 comprises a third Schmitt circuit. Wherein, provided are a transistor $T_{13}$ and a transistor $T_{12}$ connected to the emitter end of the transistor $T_9$ through the resistor 77'. The increase of the engine rotation over the predetermined number makes the emitter potential of the transistor $T_9$ fall down. This switch-overs the transistor $T_{12}$ from being conductive to non-conductive.

A current controlling circuit 59 includes a transistor $T_{16}$. The base end of the transistor $T_{16}$ is in connection with the collector end of the transistor $T_{10}$ through a resistor 79. While, the collector end thereof is connected to the emitter end of the transistor $T_9$ through resistors 83 and 80. In the idle rotation of the engine, the transistor $T_{16}$ is kept to be non-conductive since the transistor $T_{10}$ is conductive with the base voltage thereof being approximately zero. Meanwhile, applied onto a transistor $T_{15}$ through a resistor 81 is voltage from the transistor $T_9$ in the value responsing to the divided voltage between the resistor 80 and resistors 83 and 84. The transistor $T_{15}$ is thus conductive to supply the solenoid 33 with a current, in correspondence with the idling rotation of the engine.

When the engine rotation number exceeds the predetermined one in the rotation determining circuit 56, the falling-down of the emitter potential of the transistor $T_9$ makes the transistors $T_{10}$ and $T_{11}$ respectively non-conductive and conductive. The base voltage of the transistor $T_{16}$ increases and the transistor $T_{16}$ turns to be conductive. Successively, the resistor 84 is short-connected and the base potential of the transistor $T_{15}$ makes a sudden fall. In turn, the current supplied to the solenoid 33 decreases at a time from the $I_1$ to the $I_2$ value as seen in FIG. 3.

The further increase of the engine rotation makes the emitter potential of the transistor $T_9$ fall down. And the current supplied with the solenoid 33 further decreases in correspondence with the increase of the engine rotation as seen in FIG. 3.

Another current controlling circuit 60 comprises a transistor $T_{14}$. The base end of the transistor $T_{14}$ is connected to the collector end of the transistor $T_{12}$ through a resistor 82. While, the collector end thereof is in connection with the base end of the transistor $T_{15}$ through a resistor 81 and with the emitter end of the transistor $T_9$ through the resistor 80. When the engine rotation number is below the predetermined one in the rotation determining circuit 57, the transistor $T_{14}$ is non-conductive, the transistor $T_{12}$ being conductive to make the collector potential thereof approximately zero.

The increase of the engine rotation over the predetermined causes the emitter potential of the transistor $T_9$ to fall down. And the third Schmitt circuit operates to switchover the transistors $T_{12}$ and $T_{13}$ respectively from being conductive to non-conductive and from being non-conductive to conductive. This makes the collector potential of the transistor $T_{12}$ rise to turn the transistor $T_{14}$ to be conductive. Consequently, the base voltage of the transistor $T_{15}$ becomes zero and the transistor $T_{15}$ becomes non-conductive. The current supplied to the solenoid 33 also becomes zero as seen in FIG. 3.

The detecting circuit 62 for detecting the drive power train shifting operation has a contact 62a which closes when a shift lever 90 is operated. One end of the contact 62a is grounded and the other end is connected to the base end of the transistor $T_{15}$ through a resistor 86. In operation of the shift lever, the contact 62a is always closed and the transistor $T_{15}$ becomes conductive. Consequently, the current supplied to the solenoid 33 becomes the highest value.

The compensation circuit 61 comprises a thermistor 61 connected with the solenoid 33 in parallel. The thermistor 61 compensates the resistance increase and decrease of the solenoid 33 caused by the temperature increase and decrease. Thus, the current supplied to the solenoid 33 is always kept at the one controlled by means of the above-mentioned circuits.

This electric system 52 varies its supplying amount of current to the solenoid 33 in accordance with the increase and decrease of the rotation number of the prime engine as shown in FIG. 3 when no drive power train shifting operation is made. In drive power train shifting operation, the control system 52 supplies current to the solenoid 33 in the amount as shown with $I_1$ regardless of the rotation number of the prime engine of the vehicle. At the same time, the fluid pressure regulating valve means 26 controls the fluid pressure supplied from the pump 49 to the chamber 21 of the servo means 17 as shown in FIG. 4 in correspondence with the changes of the current supplied to the solenoid 33 as shown in FIG. 3. It may be seen, thus, that the changes of the fluid engine rotation changes consequently the value of the fluid pressure to be supplied to the pressure chamber 21 of the servo means 17.

With the preferred embodiment of the present invention as mentioned above, while the engine stays at its idling rotation, the electric system 52 detects the idling rotation of the engine to supply the solenoid 33 with current of $I_1$ value (see FIG. 3). Then, the fluid pressure regulating valve means 26 increases the fluid pressure value up to the one shown with $P_1$ which is supplied to the pressure chamber 21 of the servo means 17. (see FIG. 4) the piston 19 is retracted or moves leftward by thrusting force $F_1$ of the fluid pressure $P_1$ in the pressure chamber 21.

As explained previously, the retraction of the piston 19 swings the release fork 13 clockwise against the resilient force of the spring 16 through the piston rod 23 and the release wire 25. The release fork 13 then operates the release hub 15, the release bearing 14 and the release lever 7 which now swings clockwise against the resilient force of the spring 12. The clutch disc 11 disengages entirely from both of the flywheel 2 and the pressure plate 9. While the friction disc clutch 1 is in its disengaged position, the piston 19 of the servo means 17 stays at its left end position within the housing 18.

The low speed ratio drive power train being completed, the engine rotation number is increased to start the vehicle. The electric control system 52 detects the rotation increase and operates to decrease the current supplied to the solenoid 33 down to the value $I_2$ at a time at the moment the engine rotation number reaches the one shown with $N_1$ as seen in FIG. 3. Successively, the control system 52 decreases gradually the current supplied to the solenoid 33 as shown in FIG. 3. Correspondingly, the value of the fluid pressure supplied to the pressure chamber 21 decreases down to the one shown with $P_2$ at a time at the moment the engine rotation number reaches the one shown with $N_1$ as seen in FIG. 4. This eliminates any possible delay in operation to engage the friction disc clutch 1. Then, in accordance with the increase of the engine rotation number the fluid pressure value within the pressure chamber 21 has gradual decrease.

The decrease of the fluid pressure supplied to the pressure chamber 21 from $P_1$ down to $P_2$ decreases the leftward thrusting force onto the piston 19. The total resilient force of the springs 16 and 12 makes the piston 19 move rightward and finally works to engage the clutch 1 in the prosess already described. When the fluid pressure comes down to the $P_2$ value, the clutch disc 11 does not yet engage with the flywheel 2 and the pressure plate 9. The clutch disc 11 starts to engage with the two elements 2 and 9 when the fluid pressure value gets slightly lower than the one shown with $P_2$. The engaging force among the clutch disc 11, the flywheel 2 and the pressure plate 9 increases in accordance with the decrease of the fluid pressure value, or with the increase of the engine rotation number. The clutch 1 is thus half-engaged to transfer a portion of the engine torque to the driving road wheels of the vehicle. The vehicle now starts.

When the engine rotation number reaches the one shown with $N_2$ as seen in FIG. 3, the electric control system 52 operates to make the current value supplied to the solenoid 33 zero. This makes in turn the fluid pressure value supplied to the pressure chamber 21 of the servo means 17 zero. Then, the release fork 13 returns counter-clockwise to the full-back position therefor by the resilient force of the spring 16 as best shown in FIG. 1. Consequently, the clutch 1 is engaged prior to the arrival of the engine rotation number at the one shown with $N_2$. When the engine rotation increases up to $N_2$, there is no slip among the clutch disc 11, the flywheel 2 and the pressure plate 9.

Upon shifting from the low speed ratio drive power train to other ratio drive power train, the electric control system 52 detects the shifting operation and controls the current supplied to the solenoid 33 to be of the $I_1$ value. (see FIG. 3) The fluid pressure regulating valve means 26 makes the fluid pressure supplied to the pressure chamber 21 of the servo means 17 to be at the $P_1$ value, and the clutch 1 is conditioned to its disengagement. When the drive power train shifting is completed, the control system 52 detects the completion and starts controlling the current supplied to the solenoid 33 in the process as mentioned above. The clutch 1 is gradually conditioned to its engagement correspondingly with the increase of the engine rotation number.

Having now fully set forth both structure and operation of one preferred embodiment of the concept underlying the present invention, it may be that various other embodiments as well as certain variations and modifications of the embodiment therein shown and discribed will occur to those skilled in the art upon becoming familiar with said underlying concept. All such embodiments, variations, and modifications as incorporate the spirit of the invention and depend upon its underlying concept are consequently to be considered as within the scope of the claims appended herebelow, unless the claims by their language expressly state otherwise.

What is claimed is:

1. An automatic control system of a friction disc clutch for a vehicle comprising a source of fluid pressure, hydraulic servo means for engaging and disengaging said clutch, fluid pressure regulating valve means for controlling fluid pressure supplied to said servo means from said pressure source, solenoid means for regulating operation of said valve means by its energy in response to the rotation number of an engine of said vehicle whereby high pressure is supplied to said servo means during engine idling and shifting operation and gradually lowered pressure as engine rotation increases, and current control means for detecting said rotation number of said engine and for providing high voltage to said solenoid means during engine idling and shifting operation and gradually lowered voltages as engine rotation increases.

2. An automatic control system as claimed in claim 1, wherein said fluid pressure regulating valve means comprises a valve housing including a cylindrical bore therein and provided with an inlet port in connection with said fluid pressure source and a pressure chamber of said servo means and an outlet port connected with a reservoir, a spool valve reciprocatable within said bore, a spring retainer reciprocatable within said bore and operable by thrusting force of a plunger jutting out of said solenoid means when energized, a first spring stretched between said spring retainer and said spool valve, and a second spring for normally biasing said spool valve and said spring retainer toward said plunger, thereby to control fluid pressure flow supplied to said pressure chamber of said servo means from said pressure source.

3. An automatic control system as claimed in claim 2, wherein said spool valve is provided with a first land in contact with said second spring, a second land co-operating with said first land to form a first pressure chamber, and a third land co-operating with said second land to form a second chamber in connection with said inlet port and said outlet port, said first and second chambers being always connected each other by means of a through hole drilled on said spool valve, and a third chamber is formed between said third land and said spring retainer, said third chamber connected with said outlet port.

4. An automatic control system as claimed in claim 1, wherein said current control means comprises means for keeping said current supplied to said solenoid means at a predetermined high value while said engine of said vehicle is conditioned to its idling rotation, for decreasing said current at a time down to a predetermined low value when said engine rotation increases up to a preset number, for decreasing said current further in response to further increase of said engine rotation, for cutting off said current when said engine rotation reaches up a preset high number, and for increasing said current up to said predetermined high value upon shifting operation of drive power trains of said vehicle, thereby to engage said clutch when said engine rotation reaches and exceeds said preset number and to disengage said clutch when said engine is conditioned to its idling rotation and when drive power train is shifted.

5. An automatic control system as claimed in claim 1, wherein said current control means comprises a detecting circuit for detecting the rotation number of said engine as sine waves, a converter circuit for converting said sine waves to pulse signals and further to analogue voltage, a first rotation number determining circuit for controlling said current supplied to said solenoid means in response to the value of said analogue voltage, a second rotation number determining circuit for cutting off said current in response to the value of said analogue voltage, a first current control circuit for controlling said current by means of said first rotation number determining circuit, a second current control circuit for controlling said current by means of said second rotation number determining circuit, and a drive shift detecting circuit for regulating said current upon drive power train shifting operation.

6. An automatic control system as claimed in claim 5, wherein said detecting circuit of said current control means comprises a senser of an electro-magnetic pickup device and a starter gear provided on a flywheel of said engine.

7. An automatic control system as claimed in claim 5, wherein said converter circuit comprises a first transistor for amplifying said sine waves, a Schmitt circuit for converting an output of said first transistor to pulse signals, an integrator for converting said pulse signals to analogue amount, and an amplifying circuit for amplifying said analogue amount.

8. An automatic control system as claimed in claim 5, wherein said first rotation number determining circuit comprises a Schmitt circuit controlled by said analogue voltage issued from said converter circuit.

9. An automatic control system as claimed in claim 5, wherein said second rotation number determining circuit comprises a Schmitt circuit controlled by said voltage issued from said converter circuit.

10. An automatic control system as claimed in claim 5, wherein said first current control circuit comprises a transistor conducted by means of said first rotation number determining circuit.

11. An automatic control system as claimed in claim 5, wherein said second current control circuit comprises a transistor conducted by means of said second rotation number determining circuit.

12. An automatic control system as claimed in claim 5, wherein said drive shift detecting circuit comprises s switching device operated by a shift lever of the vehicle.

13. An automatic control system as claimed in claim 1, wherein said hydraulic servo means comprises a housing including a cylindrical bore therein and a port provided thereon, a piston reciprocatably engaged within said cylindrical bore to form a pressure chamber and operable by fluid pressure supplied to said pressure chamber from said pressure source through said fluid pressure regulating valve means and said port, a stopper means for determining the retraction stroke of said piston and connecting means for operatively connecting said piston to said clutch.

14. An automatic control system as claimed in claim 13, wherein said connecting means comprises a rod extending from said piston, a hook member mounted to said rod, a release wire connected with said hook member, and a release fork one end of which is connected with said release wire and the other end of which is pivoted on the vehicle body, thereby to control the engagement and disengagement of said clutch by swinging movements of said release fork.

* * * * *